United States Patent
Schad et al.

(10) Patent No.: US 10,630,038 B2
(45) Date of Patent: Apr. 21, 2020

(54) STRESS-OPTIMIZED LASER DISK MOUNTING SYSTEMS

(71) Applicant: TRUMPF LASER GMBH, Schramberg (DE)

(72) Inventors: Sven-Silvius Schad, Schramberg (DE); Alexander Killi, Trossingen (DE); Vincent Kuhn, Schiltach (DE); Markus Graf, St. Georgen (DE)

(73) Assignee: TRUMPF LASER GMBH, Schramberg (DE)

( * ) Notice: Subject to any disclaimer, the term of this patent is extended or adjusted under 35 U.S.C. 154(b) by 0 days.

(21) Appl. No.: 15/904,491

(22) Filed: Feb. 26, 2018

(65) Prior Publication Data
US 2018/0191121 A1    Jul. 5, 2018

Related U.S. Application Data

(63) Continuation of application No. PCT/EP2016/069585, filed on Aug. 18, 2016.

(30) Foreign Application Priority Data

Aug. 27, 2015   (DE) .................. 10 2015 114 263

(51) Int. Cl.
*H01S 3/02* (2006.01)
*H01S 3/08* (2006.01)
(Continued)

(52) U.S. Cl.
CPC .............. *H01S 3/025* (2013.01); *H01S 3/042* (2013.01); *H01S 3/0405* (2013.01);
(Continued)

(58) Field of Classification Search
CPC .... H01S 3/025; H01S 3/0604; H01S 3/08072; H01S 3/0407; H01S 3/042; H01S 3/0405; H01S 3/0619; H01S 3/0621
See application file for complete search history.

(56) References Cited

U.S. PATENT DOCUMENTS

3,601,343 A    8/1971 Sivaslian
5,553,088 A    9/1996 Brauch et al.
(Continued)

FOREIGN PATENT DOCUMENTS

CN    1815584 A    8/2006
CN    201871874 U    6/2011
(Continued)

OTHER PUBLICATIONS

German National Search Report in Application No. DE 10 2015 114 263.5, dated May 3, 2016, 16 pages (with English translation).
(Continued)

*Primary Examiner* — Yuanda Zhang
(74) *Attorney, Agent, or Firm* — Fish & Richardson P.C.

(57) ABSTRACT

This disclosure relates to laser disk mounting systems and methods. The laser disk mounting systems comprise a disk module with a round disk-shaped heat sink having a front side, a rear side, and an edge surface connecting the front side and the rear side, and a laser disk arranged on the front side of the heat sink, and a radial mounting device with an opening for receiving the disk module, wherein the disk module is mounted in the radial mounting device such that a force action is applied in radial direction on the edge surface.

25 Claims, 4 Drawing Sheets

(51) Int. Cl.
*H01S 3/04* (2006.01)
*H01S 3/042* (2006.01)
*H01S 3/06* (2006.01)

(52) U.S. Cl.
CPC .......... *H01S 3/0407* (2013.01); *H01S 3/0604* (2013.01); *H01S 3/08072* (2013.01); *H01S 3/0619* (2013.01); *H01S 3/0621* (2013.01)

(56) References Cited

U.S. PATENT DOCUMENTS

| | | | |
|---|---|---|---|
| 6,560,045 | B1 | 5/2003 | Schletterer |
| 6,600,763 | B2 | 7/2003 | Ludewigt |
| 6,747,789 | B2 | 6/2004 | Huonker et al. |
| 6,804,274 | B2 | 10/2004 | Huonker et al. |
| 7,200,160 | B2 | 4/2007 | Ludewigt |
| 7,529,046 | B2 | 5/2009 | Schletterer et al. |
| 7,711,025 | B2 | 5/2010 | Schmitz et al. |
| 9,436,101 | B2 | 9/2016 | Schoeppach et al. |
| 2005/0094689 | A1* | 5/2005 | Ludewigt ............... H01S 3/025 372/36 |
| 2006/0088067 | A1 | 4/2006 | Vetrovec et al. |
| 2007/0183467 | A1* | 8/2007 | Ketteridge .............. H01S 3/042 372/36 |
| 2015/0171587 | A1 | 6/2015 | Schad et al. |
| 2015/0219330 | A1* | 8/2015 | Pastrik .................. G03B 21/16 362/317 |

FOREIGN PATENT DOCUMENTS

| | | |
|---|---|---|
| CN | 103811029 A | 5/2014 |
| CN | 204216395 U | 3/2015 |
| DE | 19939774 | 3/2001 |
| DE | 10043344 | 6/2001 |
| DE | 10061424 | 6/2002 |
| DE | 10219004 | 11/2003 |
| DE | 102004018656 | 11/2005 |
| DE | 102009045163 | 4/2011 |
| DE | 102012214970 | 3/2014 |
| EP | 0583944 | 2/1994 |
| EP | 0632551 | 1/1995 |
| EP | 1178579 | 2/2002 |
| EP | 1677394 | 7/2006 |
| EP | 1689054 | 8/2006 |
| WO | WO 2013/093503 | 6/2013 |

OTHER PUBLICATIONS

Liao et al., "Pressure Tuning of Thermal Lensing for High-Power Scaling," Optics Letters, Oct. 1999, 24: 1343-1345.

International Search Report and Written Opinion in International Application No. PCT/EP2016/069585, dated Dec. 2, 2016, 18 pages (with English translation).

Office Action in Chinese Application No. 201680048362.7, dated Apr. 2, 2019, 8 pages (with English translation).

* cited by examiner

STRESS-OPTIMIZED LASER DISK MOUNTING SYSTEMS

CROSS REFERENCE TO RELATED APPLICATIONS

This application is a continuation of and claims priority under 35 U.S.C. § 120 from PCT Application No. PCT/EP2016/069585 filed on Aug. 18, 2016, which claims priority from German Application No. DE 10 2015 114 263.5, filed on Aug. 27, 2015. The entire contents of each of these priority applications is incorporated herein by reference.

TECHNICAL FIELD

The present invention relates to disk laser systems and methods and, in particular, to laser disk mounts for holding laser disk modules in a stress-optimized manner.

BACKGROUND

Plate-shaped laser active media (hereinafter also referred to as laser disks) are used within solid-state laser configurations. DE 10 2012 214 970 A1 and EP 1 677 394 A1 disclose examples of solid-state laser configurations. Laser disks can be designed, in particular, in the form of a round disk. EP 1 178 579 A2 discloses that laser disks can be attached to heat sinks such as diamond heat sinks by means of gluing, bonding, or soldering. The combination of a laser disk and a heat sink is referred to herein as a disk module and a corresponding laser system as a disk laser.

Disk modules are usually mounted for cooling in a so-called cooling finger. For example, a disk module can be clamped with three support points at a front side of the heat medium for a defined position. DE 100 61 424 A1 discloses a three-point support for clamping a laser module in which a retaining ring is subjected to a tensioning device, which applies a force in the direction of a cooling housing of the cooling finger. In laser operation, mechanical and thermal stresses of the heat sink can lead to tension and consequently deformations of the laser disk, whereby a limitation of the achievable laser power may be given.

DE 199 39 774 A1 discloses a laser disk cooling system in which a transparent supporting body is pressed against the front side of a cooling chamber wall via a ring flange. This results in a seamless connection between the laser disk and the cooling chamber. Thereby, essentially mechanical forces act on the supporting body in the direction of forces caused by the temperature gradient.

SUMMARY

The present disclosure relates to laser disk mounting systems and methods. The laser disk mounting systems and methods disclosed herein reduce the disadvantageous effects of stresses in the disk module (and the resulting non-spherical deformations) in particular in the laser disk. Such systems and methods help maintain the influence of deformations of the disk module at a low level during operation and respective thermal circumstances. These systems and methods help limit the influence of deformations of the laser disk on the operation of the laser and in particular on the power that can be coupled out.

In one aspect, a laser disk mounting system comprises a disk module that has a round-disk shaped heat sink having a front side, a rear side, and an edge surface connecting the front side and the rear side, and a laser disk arranged on the front side of the heat sink. Moreover, the laser disk mounting system includes a radial mounting device having an opening for receiving the disk module, wherein the force effect of the radial mounting device is active in a radial direction onto the edge surface.

In another aspect, a cooling finger for a disk laser system includes a cooling finger base body and such a laser disk mounting system attached to the cooling finger base body. Further aspects include disk laser systems with a cooling finger having such a laser disk mounting system and methods for radially holding a disk module.

In some embodiments, the radial mounting device, which has in particular a hollow cylinder shaped base shape, includes a collet chuck section that has a plurality of clamping arms. The clamping arms are arranged at a ring section of the radial mounting device. The clamping arms extend respectively from the ring section, in an axial direction. The clamping arms are configured for generating a clamping force that acts radially to the inside (inwardly) at a free clamping end, in particular at one or more clamping areas.

In some embodiments, the radial mounting device, which in particular has a hollow cylinder shaped base shape, is configured as a housing that includes a socket section. The socket section is arranged at a ring section of the radial mounting device. In the socket section, the heat sink is mounted by material closure, wherein the material closure is formed between the edge surface of the heat sink and an inner face of the socket section.

According to the concepts provided herein, the heat sink, acting as a support body of the laser disk, is radially clamped such that mechanical forces act between the pump laser side and the cooled side, in particular, essentially orthogonal to the thermal forces.

In some embodiments, the mounting of the disk module is achieved essentially independently from forces acting in axial direction. An example of an axial force effect is a sealing of the disk module against a cooling finger with respect to a cooling flow, wherein via a sealing ring, forces act axially on the edge of the disk module in rotationally symmetric manner.

In particular, additional features and their usefulness result from the following description of embodiments on the basis of the drawings. The drawings show:

DETAILED DESCRIPTION

Aspects described herein are partly based on the knowledge that, for mounts that act on a disk module, e.g., from the front, for example, via the three-point clamping mentioned above, there can be generated non-spherical deformations of the laser disk being provided on the laser side of the disk module. It was further realized that, by thereby created non-spherical optical effects, there can take place a resorting of laser power into undesired modes of the underlying laser resonator. This can lead to unstably running laser systems from which, for example, despite increased pumping power, one can couple out not more or even less laser power. So it was realized that a three-figure symmetry of the support points can be reflected in distortions of the laser disk, which can result in a non-spherical deformation of the laser disk and, thus, in a limitation of the achievable laser power.

Thus, it was generally determined that a mounting concept for a disk module should generate deformations as small as possible and preferably no deformations that are non-spherical. In particular, it was realized that a mounting concept of a disk module should, if possible, only lead to a spherical deformation—without non-spherical bending components.

Having this in mind, implementations disclosed herein provide contact points for mounting of the disk module that are generated on the edge surface of the heat sink, for example, by radial clamping or radial soldering. Accordingly, via radially held, e.g., radially clamped and radially mounted, disk modules, one can achieve a more symmetrical contact with the heat sink, than is possible with a contact pressure from the front. In comparison to frontal three-point clamping, the force application takes place, e.g., radially farther outside and farther to the back, i.e., at a distance from the front side of the heat sink. Thereby, the path from the point of contact to the center of the laser disk is longer and leads through the interior of the heat sink. As a result, a highly symmetrical pre-tensioning, in particular a spherical deformation, of the laser disk can be caused by implementations disclosed herein, which—as a "rotationally symmetrical lens"—has less influence on the mode formation in the disk laser than, for example, the cylinder lens-like deformations mentioned above.

In other words, it has been recognized that a mounting concept being more accurate in the spherical shape can be achieved in particular with radially clamped or radially soldered disk supports, while avoiding the otherwise occurring, e.g., three-numbered symmetry.

Furthermore, a very stable positioning of a mirrored laser disk as part of a disk laser resonator is generally important for stability of the laser resonator geometry and therefore for a stable laser operation. A very stable positioning makes it possible to reduce and potentially to prevent for a large extent micro-movements of the laser disk and the disk module, especially in the case of thermal stress during operation or in the case of mechanical stress during transport of a pre-mounted disk module. For example, the very stable positioning during pulsed operation of a disk laser is advantageous, for which heat input fluctuations into the heat sink could occur due to switch-on and switch-off processes and could lead to "working" of the contact surfaces due to the thermal stress. In this context, it was also realized that radial mounting concepts allow a very stable positioning, in particular by a special shaping of the edge surface as well as combinations of mounting options.

In the following examples of implementations, exemplary approaches are described for optimizing the stress when mounting disk modules.

Figure 1:
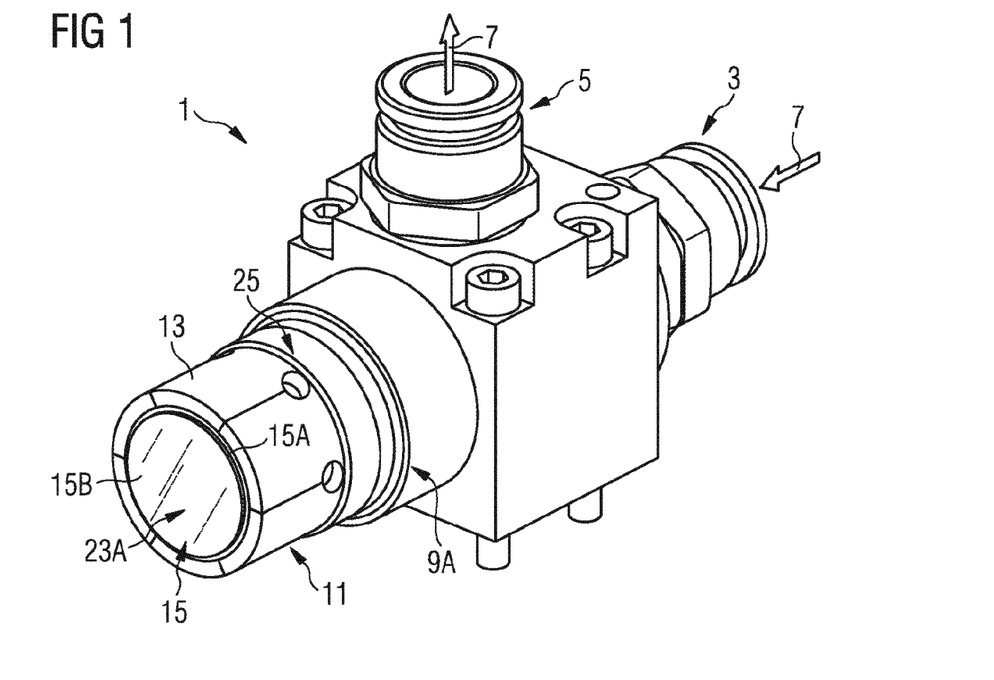
FIG. 1 shows a 3D view of a first exemplary cooling finger with a radially clamped disk module.
Figure 2:
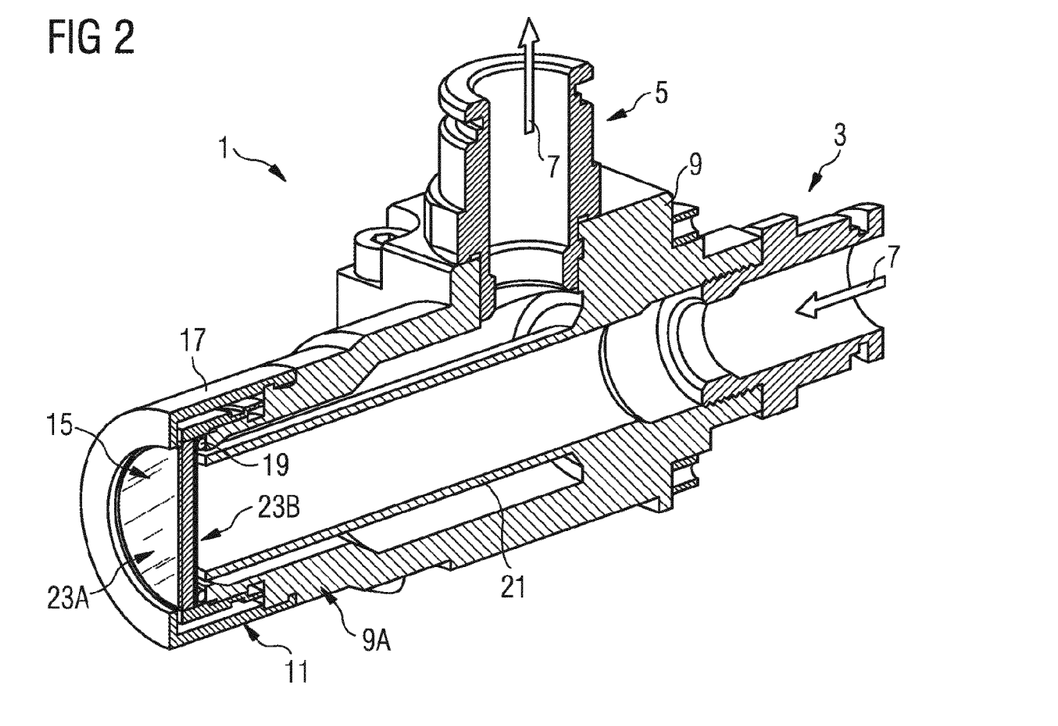
FIG. 2 illustrates a 3D cut view of a second exemplary cooling finger with a radially soldered disk module.

FIG. 1 and FIG. 2 show examples of 3D views of cooling fingers 1, as they are used, for example, in disk laser systems cooled by fluids.

Generally, the cooling finger 1 includes a coolant inlet 3 and a coolant outlet 5 (corresponding flow directions are exemplarily indicated by arrows 7 in FIGS. 1 and 2). The cooling finger 1 has a coolant conducting base body 9. At coolant conducting base body 9, there are arranged inlet 3 and outlet 5. In addition, the base body 9 has a tube socket 9A for mounting a laser disk mounting system 11.

In the configuration according to FIG. 1, the laser disk mounting system 11 has a radial mounting device 13 for clamping a disk module 15. In the configuration according to FIG. 2, the laser disk mounting system 11 has a radial mounting device 13 with a disk module 15 soldered in. Exemplary embodiments of the respective radial mounting device are explained in connection with FIG. 3A to FIG. 6C as well as FIG. 7A to 8B.

FIG. 2 further shows a shielding ring 17 as a protective cap to protect against stray light and a sealing ring 19 for sealing the disk module 15 with respect to the base body 9.

The disk module 15 includes a round disk-shaped heat sink 15A and a laser disk 15B. Exemplary dimensions of a thickness of the heat sink in an axial direction can be in the range from 0.75 mm to 7 mm, in particular in the range from 1 mm to 5 mm, in particular implementations. Examples of dimensions of a diameter of the heat sink in a radial direction can be in the range from 10 mm to 30 mm, in particular in the range from 13 mm to 25 mm, in particular implementations. The laser disk 15B has, for example, thicknesses in the range from 0.05 mm to 0.3 mm and it is excited as a laser-active medium in a disk laser system (not shown) for emission into one or more modes of the disk laser system. The laser disk is a solid, for example, consisting of a laser-active medium with a host crystal that is doped with an active material, e.g., an Yb:YAG, Yb:YLF, Yb:Lu$_2$O$_3$, Yb:LuAG, Yb:CALGO, Nd:YAG, or Nd:YVO$_4$ crystal.

Usually, the disk module 15 also includes a high-reflection (HR) coating (not shown) between the laser disk 15B and the heat sink 15A. For example, the HR coating forms an end mirror or folding mirror in the laser wavelength range of the disk laser resonator. For example, the laser disk 15B is permanently connected to the heat sink 15A at an HR-coated side.

The thermal energy introduced into the laser disk 15B by the optical pumping process is dissipated via the heat sink 15A and, moreover, a coolant circuit. Correspondingly, the laser disk 15B is mechanically and thermally coupled with the heat sink 15A, e.g., by gluing, bonding, or soldering. The laser disk 15B can heat up to 300° C. during operation.

In the following, the side of the heat sink, at which the laser disk 15B is arranged, is referred to as the front side 23A and the side exposed to the coolant flow is referred to as the rear side 23B. Due to the heat exchange with the coolant flow, the temperature of the heat sink 15A and especially of the rear side 23B is significantly reduced compared to the temperature of the laser disk 15B.

As shown in FIG. 2, the base body 9 also has a guide tube 21, which guides the coolant from the inlet 3 to the rear side 23B of the disk module 15 that faces the inside of base body 9. The coolant flows continuously at the end of the guide tube radially outwards along the rear side 23B for cooling the disk module 15 during operation of the disk laser system, before the coolant is discharged via the outlet 5.

As already indicated, the laser disk 15B warms up considerably at, for example, a pump power input of 10 kW, so that due to the cooling on the rear side 23B a corresponding temperature gradient in axial direction is built up, i.e., the temperature in the laser disk 15B and in the heat sink 15A drops from the front side 23A to the rear side 23B.

With regard to potential material tensions, especially in the laser crystal forming the laser disk 15B, the thermal expansion coefficients of the laser disk 15B and the heat sink 15A have to be considered. Due to a difference in the thermal expansion coefficients, shear stresses can be generated in the laser disk 15B through the mounting and the HR coating. Furthermore, the edge area of the disk module 15 is not subject to pump laser radiation, so that the edge area remains cooler. Correspondingly, the optically pumped and thus heated the most, central area expands primarily. Assuming the laser disk 15B would not be held on the heat sink 15A by the mounting, the laser disk 15B could, for example, bulge axially outward. Tensile stresses are generated in the mounting and in the HR coating due to the fixation on the heat sink 15A. These stresses must also be kept as low as possible during operation so that the mounting and the HR coating do not get damaged. In general, the thermally caused deformation should not cause undesired effects on the laser mode(s) operated.

The concept of a radial mounting of the disk module 15 in the area of an edge surface 23C connecting the front side 23A and the rear side 23B (see, e.g., FIG. 5 and FIG. 7A) allows holding the disk module 15 in an opening 25 of the laser disk mounting system 11 (see, e.g., FIG. 3). The concept of a radial mount of the disk module 15 can be based, for example, on clamping and/or soldering.

The laser disk mounting system 11 is configured in particular such that the disk module 15 is held by radially acting forces, in particular forces acting radially inwards or radially outwards. For example, the laser disk mounting system 11 is configured such that the disk module 15 is held by forces that are created largely symmetrically, in particular essentially rotational symmetrically or azimuthally distributed. For example, the forces can act continuously from all directions on the edge area surface 23. Alternatively, the forces can act azimuthally localized and evenly distributed and/or pairwise opposite to each other on the edge surface 23C.

In the following, in connection with FIG. 3A to 6C, exemplary embodiments of a radial mounting device based on clamping are described. In connection with FIGS. 7A, 7B, 8A, and 8B, exemplary embodiments of a radial mounting device based on soldering are described. Thereby, the radial mounting device 13 has, for example, a cylindrical ring section, which, in particular, provides an internal thread for screwing the radial mounting device 13 onto the tube socket 9A of the base body 9.

Figure 3A:
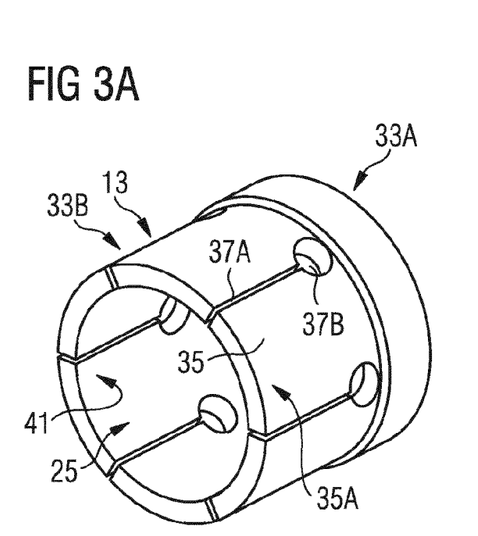
FIG. 3A and FIG. 3B are perspective views and a side view of an exemplary embodiment of a laser disk mounting system for radial clamping of a disk module.
Figure 3B:
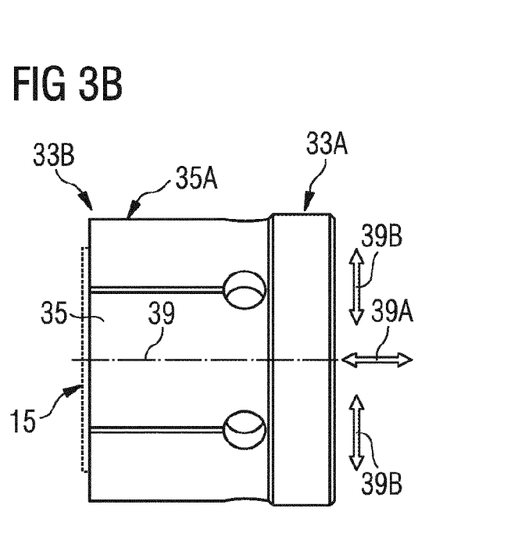

The embodiment according to FIG. 3A and FIG. 3B illustrates an example of radial clamping, which is performed via axial clamping arms 35.

FIG. 3A shows a perspective view of a radial mounting device 13 with a cylindrical ring section 33A and a collet chuck section 33B. The collet chuck section 33B has six clamping arms 35 that are attached to an end of the cylindrical ring section 33A and that extend like a hollow cylinder segment in an axial direction away from the cylindrical ring section 33A.

In the embodiment shown in FIG. 3A, the clamping arms 35 thus extend in an azimuthal angular range of almost 60° and adjacent clamping arms 35 are separated from each other by a thin gap 37A. Moreover, FIG. 3A shows cut-outs 37B, into which gaps 37A transitions within the area of ring section 33A. The shape and size of the gaps 37A and the cut-outs 37B influence the presence of a corresponding resilient force. Correspondingly, the shape and size of the gaps 37A and the cut-outs 37B are designed for the required application of force.

The clamping arms 35 and, in particular, the entire radial mount 13 are made, e.g., of hardened stainless steel, for example, to provide a respective resilient force for clamping the disk module 15 into the opening 25. For example, the clamping arms 35 have thicknesses in the radial direction in the range of a few millimeters, for example, from 2 mm to 3 mm.

However, the number of clamping arms generally depends on the available installation space. Further design parameters for the clamping arms with regard to an axially stable mount are the resilient force needed for a required friction coefficient (and the respectively required material volume), the area available for applying the pressure, and the number of support points per clamping arm 35.

Free ends 35A of the clamping arms 35 form the essentially round opening 25. For inserting the disk module 15, for example, the clamping arms 35 are spread over a mandrel by a few 100 μm, so that the disk module 15 is inserted and held after removal of the mandrel by the resilient force of the clamping arms 35.

FIG. 3B shows the radial mounting device 33 of FIG. 3A in a side view. The inserted disk module 15 is indicated by dashed lines. In addition, the spreading of the interspaces between the clamping arms 35 is illustrated to clarify the clamping. A center axis 39 of the radial mount 13 corresponds to an axial direction 39A of the laser disk mounting system 11 being cylindrical in basic shape. Originating from the central axis 39 of the radial mount 13, exemplary radial directions 39B are indicated.

Figure 4:
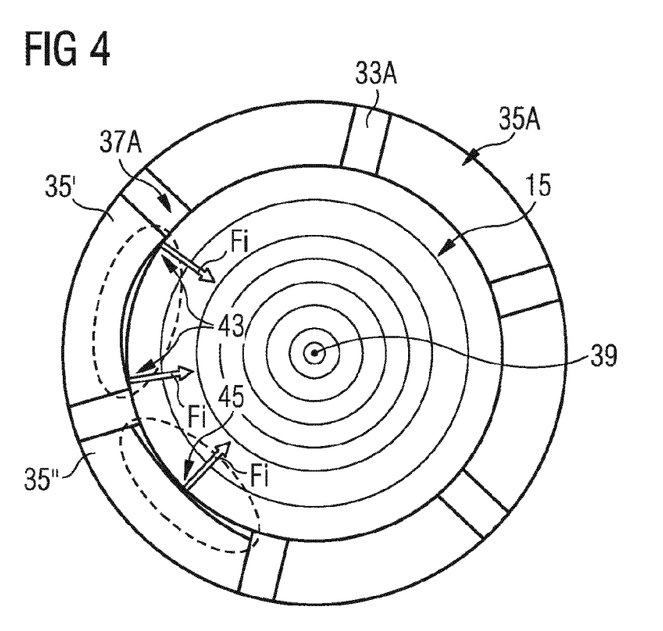
FIG. 4 shows a front view of a laser disk mounting system with a radially clamped disk module for illustration of an essentially pure spherical deformation.

FIG. 4 illustrates the formation of an essentially spherical deformation of the laser disk 15B and two exemplary shapes of an inner surface 41 of the clamping arms 35, in particular in the area of the free ends 35A.

In FIG. 4, a spherical deformation of the disk module 15, which is determined within the framework of a finite element method (FEM) model, is illustrated by means of rings that run essentially rotationally symmetric and decrease in number in a radially outward direction. Such a symmetrical deformation is generated, for example, when approaching as close as possible an azimuthally uniformly distributed, radially inwardly acting clamping force distribution through the six clamping arms 35.

In the embodiment according to FIGS. 3A, 3B, and 4, two clamping arms 35' and 35" are positioned opposite to each other with respect to the central axis 39 of the radial mounting device 13. In the unclamped state, the opening diameter of the opening 25, which is formed by the inner surface 41 of the clamping arms 35, is smaller than the outer diameter of the heat sink 15A of the disk module 15, e.g., by a few 100 μm. When the bending radii essentially coincide, a clamping is generated that extends over the entire inner surface 41 of the clamping arm 35.

For example, to become independent of any potential manufacturing tolerances of the curvature radii, FIG. 4 illustrates two exemplary embodiments of the inner side schematically for clamping arms 35' and 35".

With regard to the clamping arm 35', two azimuthal clamping ranges 43 are indicated. The forming of these two clamping ranges 43 can be achieved, for example, by providing a smaller radius of curvature on the inner surface 41 (in the following referred to as internal radius) compared to an outside radius of the heat sink 15A. Accordingly, a distribution of pairs of clamping areas 43 is formed, which each are located close to the gap 37A between two clamping arms.

An alternative shape of the curvature radii is shown for the clamping arm 35". In particular, the inner radius of the clamping arm 35" is larger than the outer radius of the heat sink 15B, so that a clamping area 45 is, for example, arranged in the center with regard to the respective clamping arm 35". Assuming again that all clamping arms are provided with corresponding inner radii, azimuthally distributed clamping areas are generated, which are formed centrally in azimuthal direction for each clamping arm at a distance of approx. 60°. In contrast to the embodiment of the clamping arm 35', instead of the twelve clamping areas, only six clamping areas are formed based on the clamping arm 35", so that possibly the resilient forces need to be adjusted accordingly.

For the two exemplary embodiments, FIG. 4 also shows the clamping forces Fi, which are directed radially inwards, for the clamping ranges 43 and 45.

Figure 5:
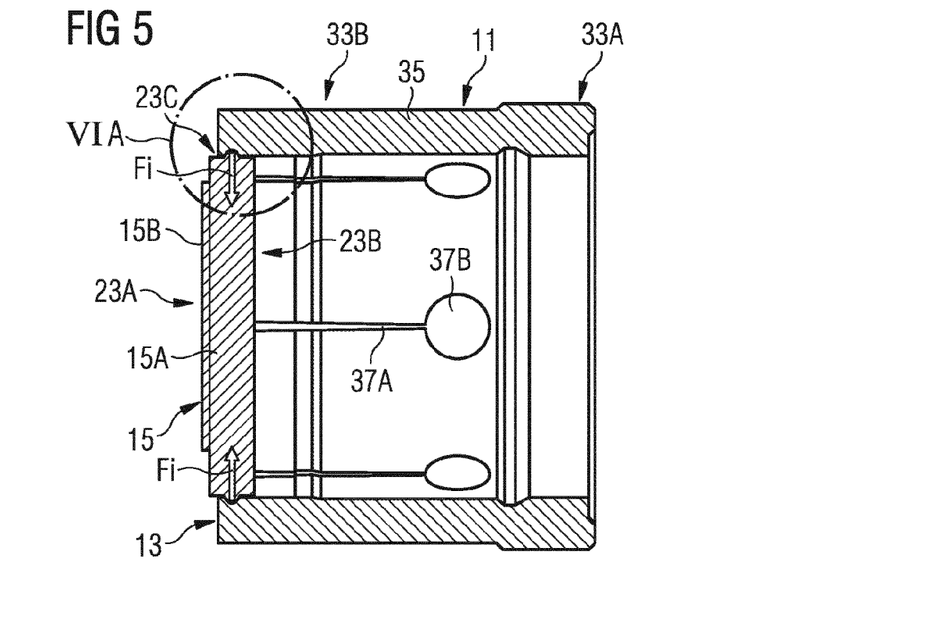
FIG. 5 illustrates a cut view of a laser disk mounting system with a radially clamped disk module.

FIG. 5 shows an exemplary cross-sectional view of a laser disk mounting system 11 similar to the implementation in FIGS. 3A and 3B. The disk module 15 is clamped by the radial mounting device 13, in particular the clamping arms 35. In FIG. 5, the rear side 23B of the heat sink 15A is shown, which is subject to the cooling water flow, and the laser disk 15B provided on the front side 23A of the heat sink 15A. The front side 23A and the rear side 23B are connected by the radially outside circumferential edge surface 23C. In the case of a cylindrical basic shape of the laser disk 15B, the edge area 23C is essentially a cylinder surface.

Due to the functionality of the disk module 15 as an end mirror or a folding mirror in the laser cavity of the disk laser system, an axially stable positioning of the disk module 15 is required. The contact area between the disk module 15 and the collet chuck section 33B of the radial mounting device 13 can be used to cause an axial positioning and fixation in addition to the resilient force.

Figure 6A:
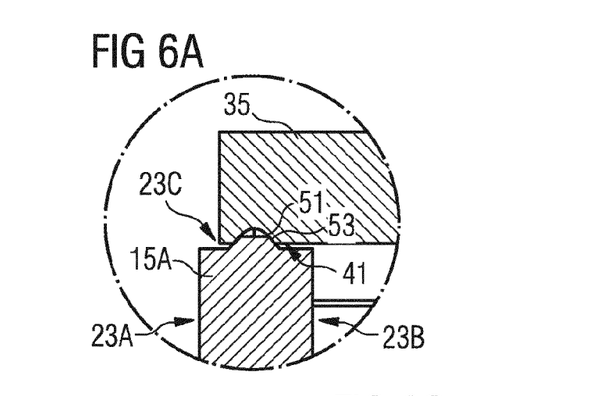
FIG. 6A to FIG. 6C are cut views of clamping areas of a laser disk mounting system for heat sinks with differently shaped edge surfaces.

FIG. 6A shows an enlarged section of the cross-sectional view in the contact area. A (circumferential) groove 51 is illustrated in the clamping arm 35 and a ring-shaped rising 53 engaged in the groove 51 on the edge surface 23C of the heat sink 15A is shown. A corresponding engagement of the rising 53 into the groove 51 fixes the disk module 15 axially.

Figure 6B:
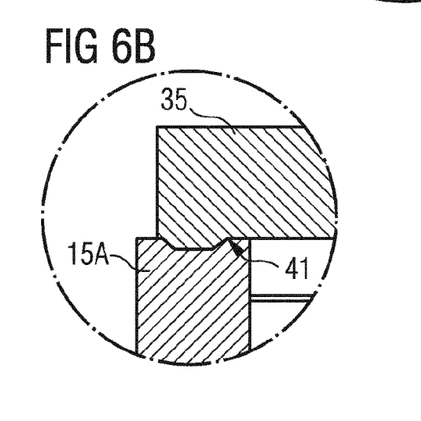

FIG. 6B shows a complementary embodiment in which a groove is provided in the edge surface 23C, and an annular rising extends on the inner surface 41 of the clamp arm 35, resulting in an axial fixation.

FIG. 6A and FIG. 6B illustrate examples of the combination of material closure and frictional force closure between the disk module 15 and the clamping arm 35. To reduce or prevent a long-term movement of the disk module with regard to radial mount 33, additional axial stabilization can be achieved by material closure. In particular implementations, the corresponding flanks of the surface structures are neatly worked, so that no essential structures are formed on the flanks, which could wear off over time or could engage with the opposing side, whereby play could be created in axial direction.

Figure 6C:
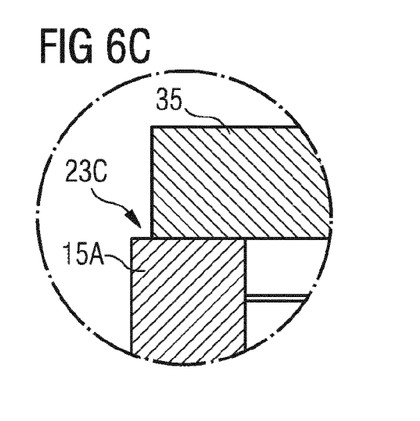

As illustrated in FIG. 6C, the frictional closure between the edge surface 23C and the inner surface 41 of the clamping arm 35 can also be achieved by a respective large flat surface pressure. For a cylindrical clamping, for example, an as flat as possible edge surface is provided for the as flat as possible pressing. For example, one can use a parallelism of the two surfaces of at least 0.001, for example, in the range from 0.01 to 0.02, and a diameter variation of 0.01 mm to 0.05 mm of the heat sink 15A, and analogous tolerances for the inner surfaces of the clamping arms. A high surface quality or a surface pressure adapted to the material pairing may allow preventing (at least reducing) micro-movements, or to ensure the orientation and position of the disk module 15 permanently (if possible over the entire operation of the laser system).

A pure frictional force closure is in particular possible if there is a frictional force that is much larger than an acting axial force. In some embodiments, even for a pure frictional force closure, the mount of the heat sink, in particular, the inner sides of the clamping arms in the relaxed state, can be made purely cylindrical.

However, a pure surface pressure may lead to an uncertainty in the zero position if the mount based purely on friction does not ensure an axial fixation. For example, a material closure can be additionally performed by introducing a joining soldering material between the disk module 15 and the clamping arm 35.

FIG. 6C is thus an example of a pure frictional force closure (cylindrical clamping) or a cylindrical clamping supplemented by an additional material closure (soldering). Thereby, the solder connects the heat sink 15A with the clamping arms 35, and the solder is formed in particular as a solder layer (not shown explicitly in FIG. 6C) between the edge surface 23C of the heat sink 15A and the inner surfaces 41 of the clamping arms 35.

In general, a material closure can be used in addition to form closure and/or frictional force closure. For example, in particular the inner surface 41 of the clamping arms and the edge surface 23C can be coated with a soft metal (e.g., gold), so that after introducing of the disk module 15, a material closure can be created by baking, the material closure fixedly positioning the disk module 15 and the radial mounting device 13 with respect to each other.

In addition to the previously described supplementary use of a material closure, the fixation of the disk module in the radial mounting device can also be performed primarily by means of material closure. Respective embodiments are explained in connection with FIGS. 7A to 8B.

In general, soldering is carried out as flat and circumferential as possible. An exemplary soldering material is an Au—Sn alloy. For side soldering, for example, the edge surface of the heat sink 15A and/or the inner side of a corresponding socket section of the radial mounting device 13 can be metallized. A coating of a diamond configured as the heat sink 15A can be made, for example, by Ti, Pt, and/or Au. A radial mounting device configured as a soldering sleeve can, for example, be coated completely with Au. A coating of the edge surface 23C, for example, with Ti, Pt, Au, can also extend at least partially over the rear side 23B, to coat the same, for example, light-tight, on the complete-surface, and abrasion-resistant.

Generally, a laser-side contamination by solder is avoided, if possible, or removed subsequently.

In particular, for a radial mounting device realized primarily by material closure, the heat sink 15A being configured, for example, as a synthetic diamond, experiences a smaller thermal expansion than a radial mounting device configured, for example, as a copper bushing. During laser operation, the copper socket expands accordingly more, so that radially to the outside pulling forces Fa act on the disk module.

Figure 7A:
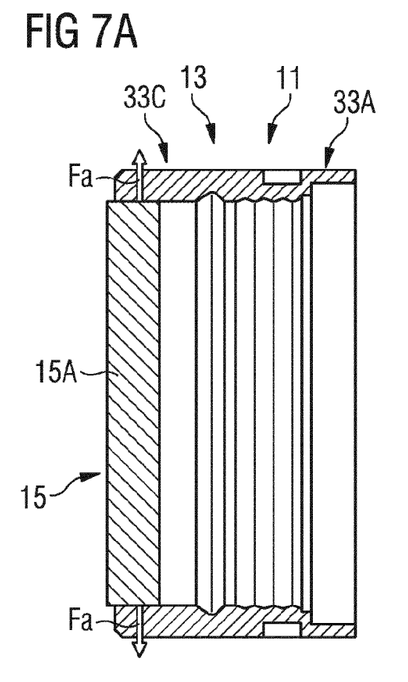
FIG. 7A and FIG. 7B are cut views of an exemplary first embodiment of a laser disk mounting system with a radially soldered disk module (with a more rigid sleeve for increased transmission of axial forces, e.g. due to the cooling water pressure).
Figure 7B:
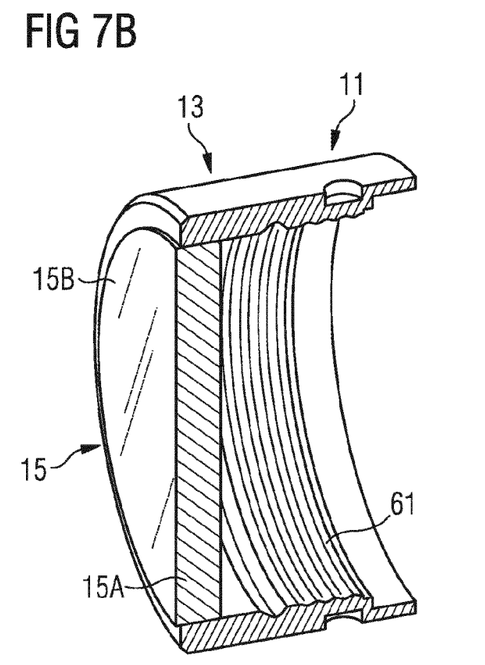

FIG. 7A and FIG. 7B show an embodiment of a laser disk mounting system 11, which is merely based on a material closure between the disk module 15 and the radial mounting device 13. In particular, radial mounting device 13 has a socket section 33C that transitions into the cylindrical ring section 33A and provides the opening for inserting the disk module.

In the embodiment according to FIG. 7A and FIG. 7B, the socket section 33C is thick-walled so that the position of the disk module 15 is maintained stable in the soldered-in state. i.e., the thickness (in radial direction) of the socket section 33C is selected such that the desired deformation is generated during thermal warming during operation. For a socket section made of copper, the wall thickness is, e.g., 1.5 mm to 3 mm.

Moreover, one can see in FIG. 7B an internal thread 61 in the ring section 33A for fixing to the base body of cooling finger 1.

Figure 8A:
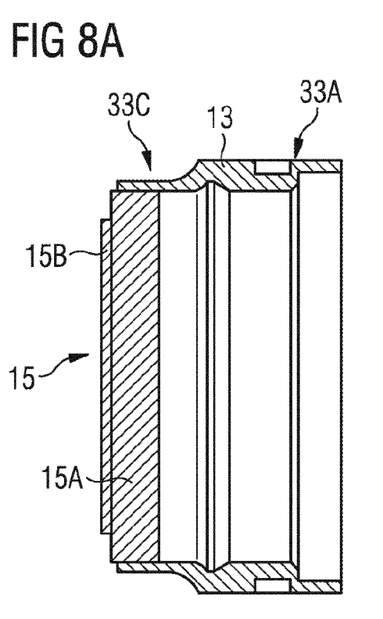
FIG. 8A and FIG. 8B show a cut view and a front view of an exemplary second embodiment of a laser disk mounting system with a radially soldered disk module (with a less rigid sleeve to reduce the forces acting on the heat sink due to the different expansion coefficients of heat sink and sleeve).
Figure 8B:
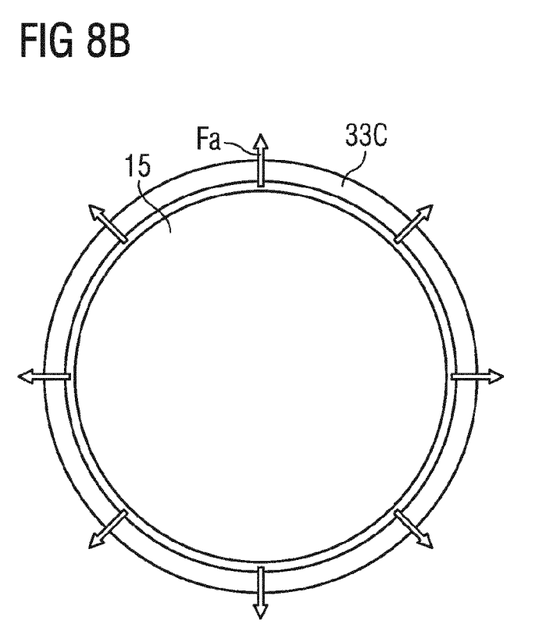

In FIG. 8A and FIG. 8B, another embodiment of a merely material closure bonded disk module 15 is shown. In the area of the socket section 33C, the sleeve is thin-walled to exert minimal or as small as possible (tensile) forces on the disk module 15 in the heated state. For this purpose, the thin-walled socket section 33C has a respective elasticity, in particular in the transition between ring section 33A and socket section 33C.

In FIG. 8B, arrows illustrate forces Fa that act radially in an outward direction during operation, i.e., in the heated state of the laser disk mounting system 11. Due to the thin-walled sleeve in FIG. 8A, the radial forces are lower than in the embodiment of FIG. 7A and FIG. 7B.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A laser disk mounting system comprising:
a disk module comprising a round disk-shaped heat sink having a front side, a rear side, and an edge surface extending about a peripheral portion of the round disk-shaped heat sink, wherein the edge surface connects the front side and the rear side of the round disk-shaped heat sink, and wherein the disk module further comprises a laser disk positioned on the front side of the round disk-shaped heat sink; and
a radial mounting device comprising a plurality of clamping arms forming a round opening for receiving the disk module, wherein the plurality of clamping arms extends in an axial direction from a ring section, and is configured to generate radially inwardly directed clamping forces at free clamping ends of each clamping arms of the plurality of clamping arms in one or more clamp areas, wherein the disk module is mounted in the radial mounting device between the plurality of clamping arms in the round opening such that the radial mounting device applies forces in radial directions on the edge surface of the round disk-shaped heat sink.

2. The laser disk mounting system of claim 1, wherein the laser disk mounting system is configured such that the disk module is held in the round opening by forces generated substantially radially symmetrically.

3. The laser disk mounting system of claim 1, wherein the laser disk mounting system is configured such that the disk module is held in the round opening by forces that are generated azimuthally and are uniformly distributed.

4. The laser disk mounting system of claim 1, wherein the clamping arms are arranged azimuthally and are uniformly distributed on the ring section.

5. The laser disk mounting system of claim 1, wherein the ring section has a cylindrical form and wherein the ring section comprises an internal thread for attachment to a coolant-guiding base body of a cooling finger.

6. The laser disk mounting system of claim 1, wherein the clamping arms are arranged pairwise opposite to each other on the ring section.

7. The laser disk mounting system of claim 1, wherein at least one of the clamping arms of the plurality of clamping arms has a groove or a rising at its free end on a radially inner surface.

8. The laser disk mounting system of claim 1, wherein at least one clamping arm of the plurality of clamping arms is configured in the manner of a hollow cylinder.

9. The laser disk mounting system of claim 1, wherein inner surfaces of the plurality of clamping arms have a cylindrical shape in a relaxed state of the plurality of clamping arms.

10. The laser disk mounting system of claim 1, wherein the plurality of clamping arms are composed, at least in part, of hardened stainless steel.

11. The laser disk mounting system of claim 1, wherein the round disk-shaped heat sink is composed, at least in part, of a synthetic diamond.

12. The laser disk mounting system of claim 1, wherein a free clamping end of at least one clamping arm of the plurality of clamping arms has a radius of curvature on a radially inner surface that is smaller or larger than a radius of curvature of the edge surface of the round disk-shaped heat sink.

13. The laser disk mounting system of claim 1, wherein the edge surface is additionally at least partly connected to a radially inner surface of at least one of the clamping arms with a connection producing material closure.

14. The laser disk mounting system of claim 13, wherein the connection producing material closure comprises a soldered connection.

15. The laser disk mounting system of claim 1, wherein the edge surface of the heat sink extends in the axial direction, and the front side and the rear side extend in the radial direction.

16. The laser disk mounting system of claim 1, wherein the edge surface of the heat sink is a cylindrical surface that extends perpendicular to the front side and the rear side.

17. The laser disk mounting system of claim 1, wherein the edge surface has a recess or a rising, and the radial mounting device has a correspondingly opposite arranged rising or recess for axial fixation of the disk module in the radial mounting device.

18. The laser disk mounting system of claim 1, wherein the edge surface provides a parallelism with respect to an inner surface of the clamping arms in the range from 0.01 to 0.02 mm, and tolerances in a mean diameter of the heat sink of at most 0.01 mm to 0.05 mm.

19. The laser disk mounting system of claim 1, wherein the disk module comprises a laser radiation reflecting layer between the laser disk and the heat sink.

20. The laser disk mounting system of claim 1, further comprising a cooling finger for a disk laser system comprising a cooling finger base body, wherein the cooling finger base body is configured to provide a coolant flow flowing to the rear side of the heat sink.

21. The laser disk mounting system of claim 20, wherein the cooling finger base body is configured for screwing onto the laser disk mounting system.

22. A laser disk mounting system comprising:
a disk module comprising a round disk-shaped heat sink having a front side, a rear side, and an edge surface extending about a peripheral portion of the round disk-shaped heat sink, wherein the edge surface connects the front side and the rear side of the round disk-shaped heat sink, and wherein the disk module further comprises a laser disk positioned on the front side of the round disk-shaped heat sink; and
a radial mounting device comprising a round opening for receiving the disk module, wherein the radial mounting device is configured as a housing with a socket section, wherein the heat sink is held in the socket section by a material closure, and wherein the material closure is formed between the edge surface of the round disk-shaped heat sink and an inner surface of the socket section.

23. The laser disk mounting system of claim 22, wherein the socket section has a thermal expansion coefficient that is greater than the thermal expansion coefficient of the heat sink, so that during laser operation a radially outward acting force acts on the edge surface of the heat sink via the material closure.

24. The laser disk mounting system of claim 22, wherein at least one of the socket sections is composed, at least in part, of copper and the round disk-shaped heat sink is a synthetic diamond.

25. The laser disk mounting system of claim 22, wherein the radial mounting device is formed as a solder-in-housing, which has a solder-in-socket arranged at the ring section, into which the heat sink is radially soldered, such that a soldering connection between the edge surface of the heat sink and an inner surface of the solder-in-socket forms the material closure.

* * * * *